J. B. ELLIOTT.
COUPLING.
APPLICATION FILED MAY 17, 1913.
1,138,946.
Patented May 11, 1915.
Fig. 1.
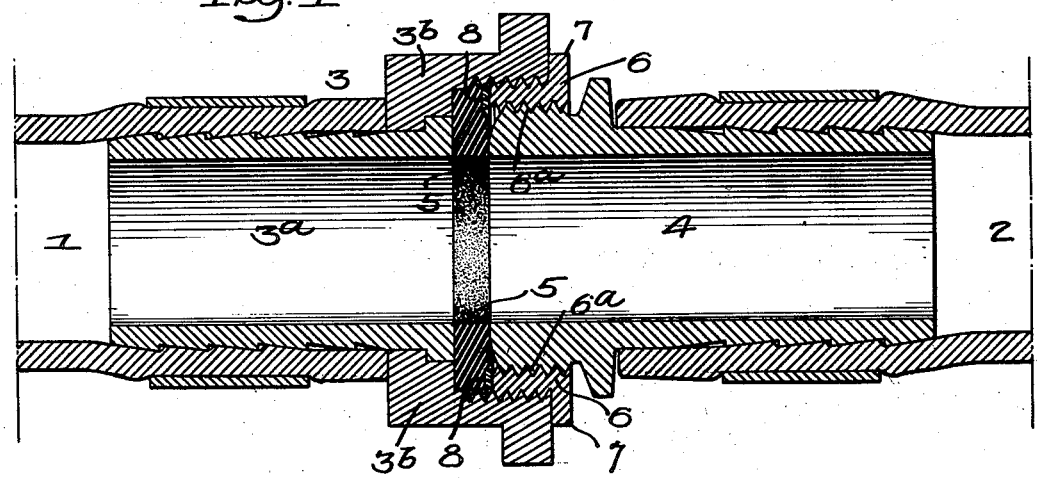
Fig. 2.
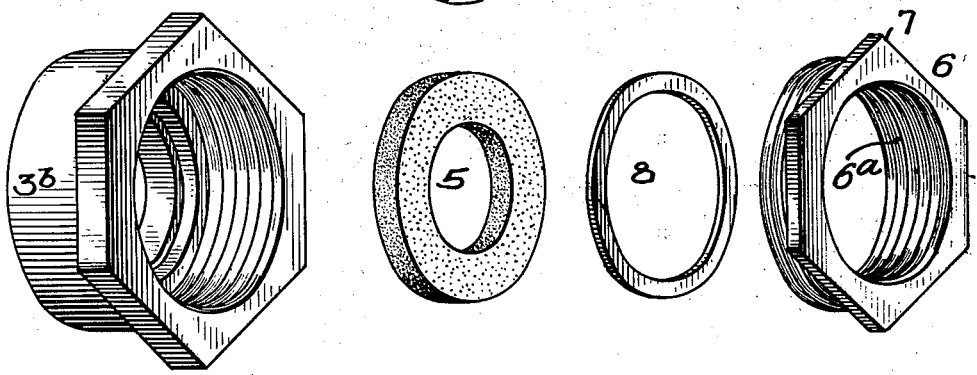
Fig. 4.  Fig. 3.  Fig. 5.
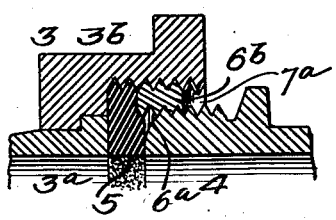 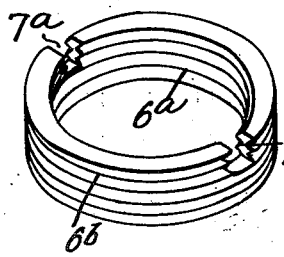 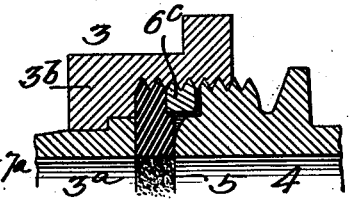
Witnesses—
William F. Nau
Willet Burrows
Inventor—
James B. Elliott
by his Attorneys—
Howson & Howson

UNITED STATES PATENT OFFICE.

JAMES B. ELLIOTT, OF RIVERTON, NEW JERSEY.

COUPLING.

1,138,946.

Specification of Letters Patent.

Patented May 11, 1915.

Application filed May 17, 1913. Serial No. 768,238.

*To all whom it may concern:*

Be it known that I, JAMES B. ELLIOTT, a citizen of the United States, and a resident of Riverton, Burlington county, New Jersey, have invented certain Improvements in Couplings, of which the following is a specification.

My invention relates to couplings for connecting tubular members, pipe, hose, and the like; and the main object of my invention is to provide a coupling with simple means for retaining a washer in place and insuring the disposal of the same in proper position for engagement by the parts of the coupling so as to make a properly tight joint, available for use with any line conveying fluid or liquid.

These and other features of my invention are more fully described hereinafter, reference being had to the accompanying drawings forming part thereof, in which:

Figure 1, is a longitudinal section of a coupling embodying my invention, showing the improvements applied to a hose coupling; Fig. 2, is a perspective view illustrating the parts of the structure shown in Fig. 1 detached; Fig. 3, is a perspective view illustrating a modified construction within the scope of my invention, and Figs. 4 and 5 are further modifications within the scope of my invention.

In the coupling of tubular members, more particularly those which may be employed for short periods of time in a coupled condition, such for instance as air hose, or hose or piping employed in greenhouses, truck farms, and the like, it is a frequent occurrence that the washers employed to insure properly tight joints are lost, and the important feature of my invention is to provide retaining means for the washer.

In the drawing, 1 and 2 represent hose sections or pipe ends to be coupled. If hose sections, they usually carry metal parts, such as those indicated at 3 and 4, to effect the coupling; the part 3 being duplex in that it has a swivel portion 3ª to which the hose is directly attached, which part 3ª is rotatable within the threaded portion 3ᵇ; said portion 3ᵇ normally receiving the externally threaded portion 4 which may form part of another pipe or, as illustrated, be carried by a section of hose to be connected. As ordinarily used, the internally threaded portion 3ᵇ has its seat adjacent the swivel part 3ª, the inner end of which may be and preferably is in the same plane as the seat of the portion 3ᵇ, and which receives a washer 5 against which the end of the externally threaded portion 4 is pressed when the parts are connected. This end is preferably rounded as shown.

The parts of the structure thus described are substantially or precisely similar to other couplings employed for the same purpose as heretofore made, but instead of loosely placing the washer on the seat formed by the end of the swivel member 3ª and the bottom of the recess of the internally threaded member 3ᵇ, I provide retaining means for such washer. Such means comprise a device which may be in the shape of a threaded sleeve or collar 6, adapted to the internally threaded portion of the member 3ᵇ and being additionally internally threaded at 6ª for the reception of the externally threaded member 4 carried by the hose or pipe sections.

The sleeve 6 may have an angular head 7 whereby it may be engaged by a suitable spanner wrench to insure its placement in the structure, and while this head should only be thick enough to permit engagement by the wrench, it should preferably be turned down so as to engage the end of the internally threaded portion 3ᵇ, as shown in Fig. 1. If desired, the retaining member may omit the head, as shown at 6ᵇ in Figs. 3 and 4, and have its wall notched at 7ª, for engagement by the blade of a screw driver or similar operating device.

In order that there may be no excessive wear upon the material of the washer, which may be rubber or any material suitable for a gasket, I may interpose a wear ring 8 between the same and the retaining sleeve or collar 6. The use of such wear ring is not absolutely necessary, however, and in the constructions illustrated in Figs. 4 and 5, it has been omitted. In Fig. 4, a retaining member 6ᵇ, such as illustrated in Fig. 3, is shown in direct engagement with the washer. A similar arrangement is shown in Fig. 5, in which a smaller retaining member 6ᶜ is employed and the end 4 of the coupling is threaded into the portion 3ᵇ of the part 3 of the coupling in the usual manner; being recessed at its end as at 4ª to pass over the retaining member 6ᵇ.

This retaining sleeve or collar is a substantially permanent member, although it should be arranged so as to be removable when it becomes necessary to place a new washer should conditions of wear require the same.

While the retaining members 6, 6$^b$ or 6$^c$, may be made of cast metal subsequently threaded, they may be made of sheet metal pressed or spun into shape, with the threads applied in any suitable or convenient manner.

While I have shown the swiveled part, 3$^a$ and the internally threaded portion, 3$^b$, as being formed of separate pieces, which jointly form the seat for the washer, it will be obvious that these parts may be made of one piece. In either case, the washer for substantially its entire width is confined between the alined ends of the coupling members, the said washer being engaged near its periphery by the washer holding means.

I claim:

1. In a coupling, the combination of an internally-threaded member having a seat, a washer carried by said member and engaging the said seat, means adapted to the threads of the internally-threaded member to permanently hold the washer to its seat when the coupling is disassembled, and an externally-threaded coupling member for insertion in the internally-threaded member, said coupling members being axially alined, and said washer being interposed between the alined ends of said members and engaged near its periphery by said holding means.

2. In a coupling, the combination of an internally-threaded member having a seat, a washer carried by said member and engaging said seat, a threaded sleeve adapted to the internally-threaded coupling member and serving to hold the washer in place when the coupling is disassembled, and an externally-threaded coupling member for insertion in the internally-threaded member, said sleeve being internally-threaded for the reception of said externally-threaded member, said coupling members being axially alined, and said washer being interposed between the alined ends of said coupling members and engaged near its periphery by said threaded sleeve.

In testimony whereof, I have signed my name to this specification, in the presence of two subscribing witnesses.

JAMES B. ELLIOTT.

Witnesses:
R. E. MATTIS,
HOWARD R. ELLIOTT.